United States Patent
Lin et al.

(10) Patent No.: US 8,988,905 B2
(45) Date of Patent: Mar. 24, 2015

(54) PWM CONTROLLER DETECTING TEMPERATURE AND AC LINE VIA A SINGLE PIN AND POWER CONVERTER USING SAME

(71) Applicant: Grenergy Opto Inc., Hsin-Chu (TW)

(72) Inventors: Huang-Chi Lin, Hsin-Chu (TW); Chun-Liang Lin, Hsin-Chu (TW)

(73) Assignee: Grenergy Opto, Inc., Hsin-Chu (TW)

( * ) Notice: Subject to any disclaimer, the term of this patent is extended or adjusted under 35 U.S.C. 154(b) by 228 days.

(21) Appl. No.: 13/674,445

(22) Filed: Nov. 12, 2012

(65) Prior Publication Data

US 2014/0132228 A1    May 15, 2014

(51) Int. Cl.
*H02M 3/335* (2006.01)
(52) U.S. Cl.
USPC ............. 363/21.18; 363/147; 363/21.13

(58) Field of Classification Search
USPC ............ 363/21.04, 21.05, 21.07, 21.1, 21.11, 363/21.12, 21.13, 21.15, 21.18, 147; 374/56, 152, 163, 179
See application file for complete search history.

(56) References Cited

U.S. PATENT DOCUMENTS

| | | | |
|---|---|---|---|
| 5,408,401 A * | 4/1995 | Miyazaki | 363/21.08 |
| 7,339,359 B2 * | 3/2008 | Choi et al. | 323/284 |
| 2012/0206117 A1 * | 8/2012 | Yang et al. | 323/282 |
| 2013/0083562 A1 * | 4/2013 | Wu et al. | 363/16 |
| 2013/0121044 A1 * | 5/2013 | Gao et al. | 363/50 |
| 2013/0301302 A1 * | 11/2013 | Wu et al. | 363/15 |

* cited by examiner

*Primary Examiner* — Gary L Laxton
*Assistant Examiner* — Alex Torres-Rivera
(74) *Attorney, Agent, or Firm* — Ming Chow; Sinorica, LLC (57) ABSTRACT

A PWM controller detecting temperature and AC line via a single pin and a power converter using the PWM controller, the PWM controller comprising: an output pin for providing a PWM signal; and a dual-function pin for receiving a temperature signal when the PWM signal is at a high level, and for receiving an AC line signal when the PWM signal is at a low level.

8 Claims, 7 Drawing Sheets

PWM CONTROLLER DETECTING TEMPERATURE AND AC LINE VIA A SINGLE PIN AND POWER CONVERTER USING SAME

BACKGROUND OF THE INVENTION

1. Field of the Invention

The present invention relates to a PWM controller and a power converter, especially to a PWM controller detecting temperature and AC line via a single pin, and a power converter including the PWM controller.

2. Description of the Related Art

Figure 1:
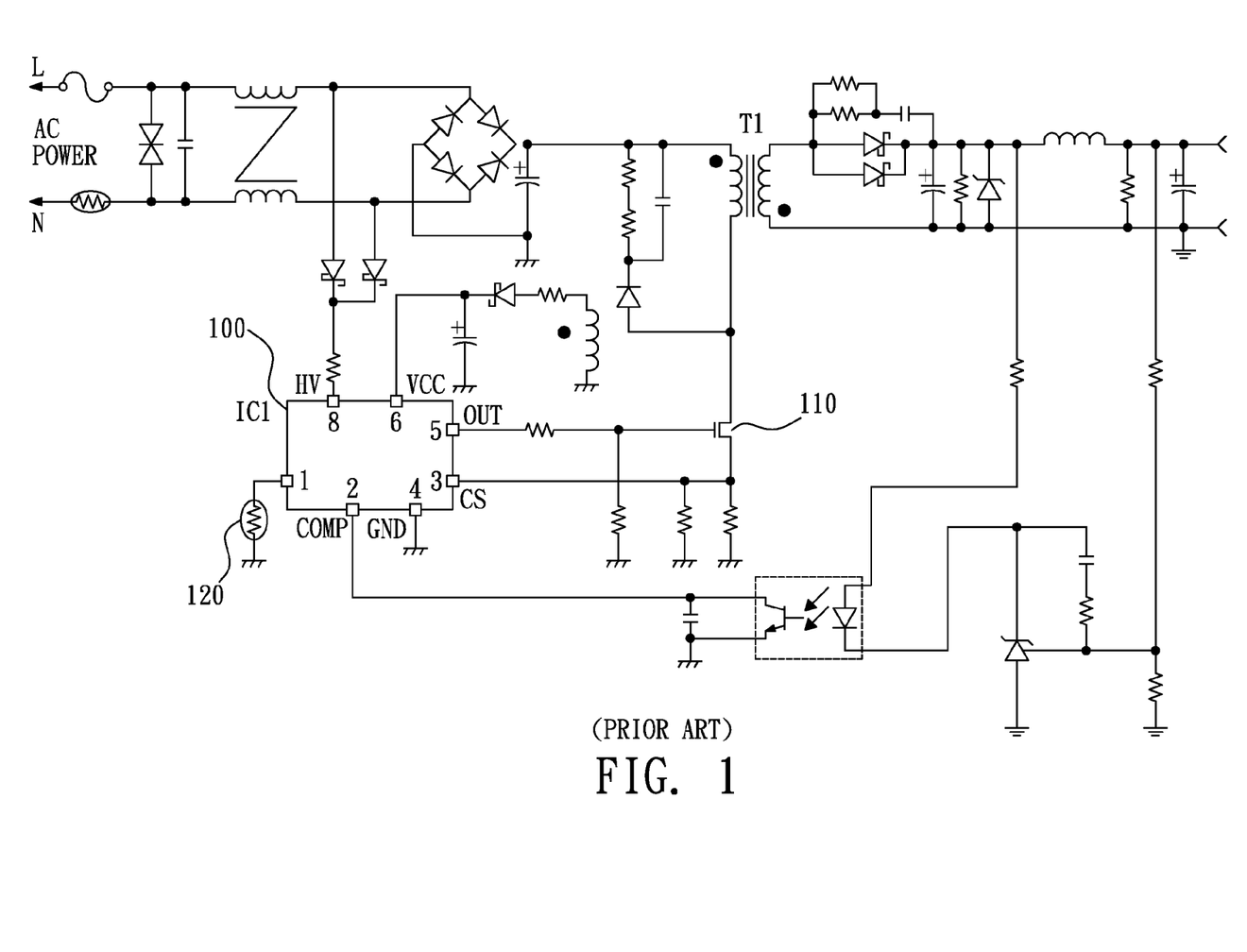
FIG. 1 illustrates a circuit diagram of a prior art AC-to-DC converter having an over-temperature protection function.

To prevent damage caused by high temperatures, general power converters are implemented with an over-temperature protection function. Please refer to FIG. 1, which illustrates a circuit diagram of a prior art AC-to-DC converter having an over-temperature protection function. As illustrated in FIG. 1, the prior art AC-to-DC converter includes a PWM controller 100, an NMOS transistor 110, and a negative-temperature-coefficient resistor 120.

The PWM controller 100 has an output pin (number 5) for providing a PWM signal to drive the NMOS transistor 110, and has a pin (number 1) for detecting temperature.

The negative-temperature-coefficient resistor 120, which is preferably located beside the NMOS transistor 110, has a resistance dependent on temperature—the higher the temperature, the smaller the resistance. When temperature exceeds a threshold temperature, a reduced resistance smaller than a threshold resistance will be detected by the PWM controller 100, and the PWM controller 100 will shut down the PWM signal accordingly.

Figure 2:
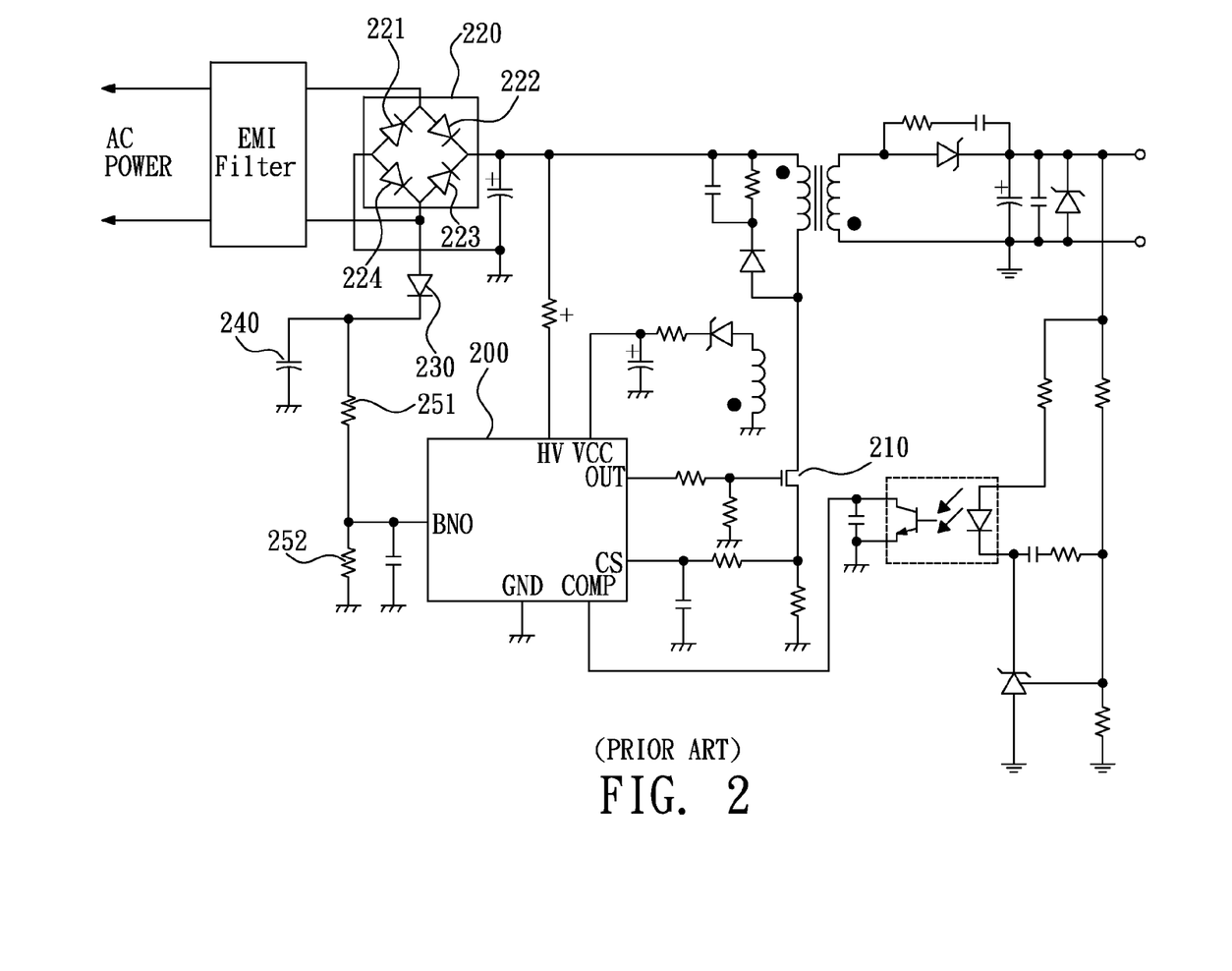
FIG. 2 illustrates a circuit diagram of a prior art AC-to-DC converter having an AC line brownout protection function.

In addition to over-temperature protection, AC line brownout protection capable of shutting down power transmission when AC line voltage drops to under a threshold is also important for AC-to-DC converters. Please refer to FIG. 2, which illustrates a circuit diagram of a prior art AC-to-DC converter having an AC line brownout protection function. As illustrated in FIG. 2, the prior art AC-to-DC converter includes a PWM controller 200, an NMOS transistor 210, a bridge rectifier 220, a diode 230, a capacitor 240, and resistors 251-252.

The PWM controller 200 has an output pin (OUT) for providing a PWM signal to drive the NMOS transistor 210, and has a pin (BNO) for receiving a sensed signal corresponding to a voltage amplitude of an AC power.

The bridge rectifier 220 has diodes 221-224 for performing a full-wave rectification of the AC power.

The diode 230 and the capacitor 240 are used to generate a first voltage by rectifying and filtering a line voltage of the AC power.

The resistors 251-252 are used to divide the first voltage to generate the sensed signal.

When the voltage amplitude of the AC power decreases to cause the sensed signal to fall below a threshold, the PWM controller 200 will shut down the PWM signal to prevent the NMOS transistor 210 from getting damage (As is known, a smaller amplitude of the AC power will result in a larger power consumption on the NMOS transistor 210, so the PWM signal has to be shut down when the sensed signal falls below the threshold to prevent the power consumption of the NMOS transistor 210 from exceeding a rated value).

Due to a limited pin count of the package for PWM controllers, general PWM controllers are either designed to have an over-temperature protection function as illustrated in FIG. 1, or designed to have an AC line brownout protection function as illustrated in FIG. 2. To integrate these two functions in one chip, a larger pin count and therefore a larger package has to be used. However, this will increase package cost and board area.

To solve the foregoing problems, a novel PWM controller and a corresponding power conversion architecture are needed.

SUMMARY OF THE INVENTION

One objective of the present invention is to disclose a PWM controller capable of detecting temperature and AC line voltage via a single pin.

Another objective of the present invention is to disclose a PWM controller capable of providing an over-temperature protection and an AC line brownout protection via a single pin.

Another objective of the present invention is to disclose a power converter using a PWM controller capable of detecting temperature and AC line voltage via a single pin.

Still another objective of the present invention is to disclose a power converter using a PWM controller capable of providing an over-temperature protection and an AC line brownout protection via a single pin.

To attain the foregoing objectives, a PWM controller detecting temperature and AC line via a single pin is proposed, including:

a current source, having a current output end for providing a constant current;

a first switch, having a first control end, a first channel end, and a second channel end, the first control end being coupled to a first control signal, which is active when a PWM signal is at a high level, the first channel end being coupled to the current output end of the current source, and the second channel end being coupled to a dual-function pin;

a second switch, having a second control end, a third channel end, and a fourth channel end, the second control end being coupled to the first control signal, and the third channel end being coupled to the dual-function pin;

a first sample-and-hold circuit, having an input coupled with the fourth channel end, and an output for providing a first sampled voltage;

a first detection circuit, having an input terminal coupled to the output of the first sample-and-hold circuit, and an output terminal for providing a first detection signal, wherein the first detection signal will be at an active level to shut down the PWM signal when the first sampled voltage has stayed below a first threshold for more than a first period;

a third switch, having a third control end, a fifth channel end, and a sixth channel end, the third control end being coupled to a second control signal, which is active when the PWM signal is at a low level, and the fifth channel end being coupled to the dual-function pin, wherein the dual function pin is used for receiving a temperature signal when the PWM signal is at the high level, and for receiving an AC line signal when the PWM signal is at the low level;

a second sample-and-hold circuit, having an input coupled with the sixth channel end, and an output for providing a second sampled voltage; and a second detection circuit, having an input terminal coupled to the output of the second sample-and-hold circuit, and an output terminal for providing a second detection signal, wherein the second detection signal will be at an active level to shut down the PWM signal when the second sampled voltage has stayed below an upper-bound voltage for more than a second period after falling below a lower-bound voltage.

In one embodiment, the first detection circuit includes:

a first comparator, having a first positive input, a first negative input, and a first comparison output, the first positive input being coupled to a reference voltage set at the first threshold, and the first negative input being coupled with the input terminal of the first detection circuit; and a first debounce circuit, having an input coupled to the first comparison output, an output coupled with the output terminal of the first detection circuit, and a first debounce time set equal to the first period.

In one embodiment, the second detection circuit includes:

a second comparator, having a second positive input, a second negative input, and a second comparison output, the second positive input being coupled to an upper-bound voltage or a lower-bound voltage, the second negative input being coupled with the input terminal of the second detection circuit, and the second comparison output providing a reset signal; and a second debounce circuit, having an input coupled to the second comparison output, an output coupled with the output terminal of the second detection circuit, and a second debounce time set equal to the second period.

In one embodiment, the second debounce circuit includes:

multiple flip-flops, each of which has a data input, a clock input, a reset input, and a state output, with the data input coupled to a DC voltage and the reset input coupled to the reset signal, wherein the clock input of a first flip-flop of the multiple flip-flops is coupled with a clock signal, the clock input of each of the other of the multiple flip-flops being coupled with the state output of a preceding flip-flop; and the state output of a last flip-flop of the multiple flip-flops provides the second detection signal.

To attain the foregoing objectives, another PWM controller detecting temperature and AC line via a single pin is proposed, including:

an output pin for providing a PWM signal; and a dual-function pin for receiving a temperature signal when the PWM signal is at a high level, and for receiving an AC line signal when the PWM signal is at a low level.

To attain the foregoing objectives, a power converter detecting temperature and AC line via a single pin is proposed, including:

a PWM controller, including:

a current source, having a current output end for providing a constant current;

a first switch, having a first control end, a first channel end, and a second channel end, the first control end being coupled to a first control signal, which is active when a PWM signal is at a high level, the first channel end being coupled to the current output end of the current source, and the second channel end being coupled to a dual-function pin;

a second switch, having a second control end, a third channel end, and a fourth channel end, the second control end being coupled to the first control signal, and the third channel end being coupled to the dual-function pin;

a first sample-and-hold circuit, having an input coupled with the fourth channel end, and an output for providing a first sampled voltage;

a first detection circuit, having an input terminal coupled to the output of the first sample-and-hold circuit, and an output terminal for providing a first detection signal, wherein the first detection signal will be at an active level to shut down the PWM signal when the first sampled voltage has stayed below a first threshold for more than a first period;

a third switch, having a third control end, a fifth channel end, and a sixth channel end, the third control end being coupled to a second control signal, which is active when the PWM signal is at a low level, and the fifth channel end being coupled to the dual-function pin;

a second sample-and-hold circuit, having an input coupled with the sixth channel end, and an output for providing a second sampled voltage; and a second detection circuit, having an input terminal coupled to the output of the second sample-and-hold circuit, and an output terminal for providing a second detection signal, wherein the second detection signal will be at an active level to shut down the PWM signal when the second sampled voltage has stayed below an upper-bound voltage for more than a second period after falling below a lower-bound voltage; and a sensing circuit, including:

a first resistor, having one end coupled to an AC line signal and another end coupled to a common contact, wherein the AC line signal is corresponding to a voltage amplitude of an AC power;

a second resistor, having one end coupled to the common contact and another end coupled to a ground;

a negative-temperature-coefficient resistor, having one end coupled to the common contact and another end coupled to the dual-function pin; and a second NMOS transistor, having a drain coupled to the common contact, a gate coupled to the PWM signal, and a source coupled to the ground.

In one embodiment, the first detection circuit includes:

a first comparator, having a first positive input, a first negative input, and a first comparison output, the first positive input being coupled to a reference voltage set at the first threshold, and the first negative input being coupled with the input terminal of the first detection circuit; and a first debounce circuit, having an input coupled to the first comparison output, an output coupled with the output terminal of the first detection circuit, and a first debounce time set equal to the first period.

In one embodiment, the second detection circuit includes:

a second comparator, having a second positive input, a second negative input, and a second comparison output, the second positive input being coupled to an upper-bound voltage or a lower-bound voltage, the second negative input being coupled with the input terminal of the second detection circuit, and the second comparison output providing a reset signal; and a second debounce circuit, having an input coupled to the second comparison output, and an output coupled with the output terminal of the second detection circuit, and a second debounce time set equal to the second period.

In one embodiment, the second debounce circuit includes:

multiple flip-flops, each of which has a data input, a clock input, a reset input, and a state output, with the data input coupled to a DC voltage and the reset input coupled to the reset signal, wherein the clock input of a first flip-flop of the multiple flip-flops is coupled with a clock signal, the clock input of each of the other of the multiple flip-flops being coupled with the state output of a preceding flip-flop; and the state output of a last flip-flop of the multiple flip-flops provides the second detection signal.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 3:
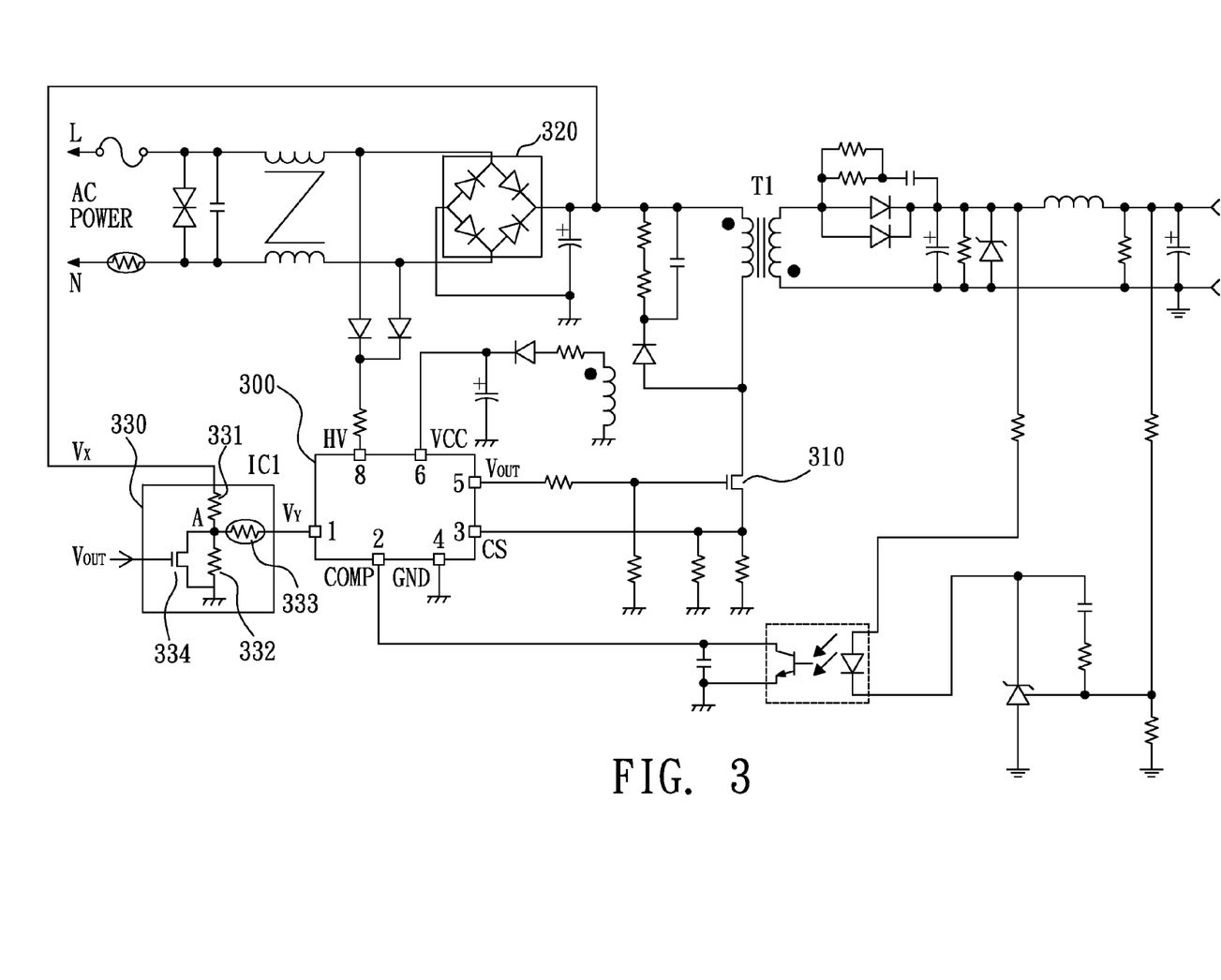
FIG. 3 illustrates a circuit diagram of a power converter according to a preferred embodiment of the present invention.

Please refer to FIG. 3, which illustrates a circuit diagram of a power converter according to a preferred embodiment of the present invention. As illustrated in FIG. 3, the power converter includes a PWM controller 300, a first NMOS transistor 310, a bridge rectifier 320, and a sensing circuit 330.

The PWM controller 300 has an output pin (pin 5) for providing a PWM signal $V_{OUT}$ to drive the first NMOS transistor 310, and has a dual-function pin (pin 1) for receiving a sensed signal $V_Y$.

The first NMOS transistor 310 is used to control a power transformation of the power converter in response to the PWM signal $V_{OUT}$.

The bridge rectifier 320 has two input ends for coupling to an AC power, a positive output end for providing a full-wave rectified voltage of the AC power, and a negative output end coupled to a ground.

The sensing circuit 330 includes a first resistor 331, a second resistor 332, a negative-temperature-coefficient resistor 333, and a second NMOS transistor 334.

The first resistor 331 has one end coupled to an AC line signal $V_X$ and another end coupled to a common contact A. The AC line signal $V_X$ is derived from the positive output end of the bridge rectifier 320 and is corresponding to a voltage amplitude of the AC power. The second resistor 332 has one end coupled to the common contact A and another end coupled to the ground. The negative-temperature-coefficient resistor 333 has one end coupled to the common contact A and another end coupled to the dual-function pin of the PWM controller 300 for generating the sensed signal $V_Y$. The second NMOS transistor 334 has a drain coupled to the common contact A, a gate coupled to the PWM signal $V_{OUT}$, and a source coupled to the ground. It is to be noted that the second NMOS transistor 334 driven by the PWM signal $V_{OUT}$ can be replaced with a PMOS transistor driven by a complementary signal of the PWM signal $V_{OUT}$.

When in operation, the sensed signal $V_Y$ will represent a temperature and a voltage amplitude of the AC power during each of high level periods and each of low level periods of the PWM signal $V_{OUT}$ respectively. When the PWM signal $V_{OUT}$ is at a high level, the second NMOS transistor 334 will be turned on to pull down the common contact A to the ground, and a current will be provided by the PWM controller 300 to flow out of the dual-function pin to develop a first voltage across the negative-temperature-coefficient resistor 333 to represent a corresponding temperature. When the PWM signal $V_{OUT}$ is at a low level, the second NMOS transistor 334 will be turned off, and the first resistor 331 and second resistor 332 will divide the AC line signal $V_X$ to generate a second voltage to represent a corresponding voltage amplitude of the AC power. The PWM controller 300 will derive the first voltage and the second voltage in an alternating manner via the sensed signal $V_Y$.

When the first voltage falls below a first threshold for more than a first period, it is defined as an over-temperature event, and the PWM controller 300 will shut down the PWM signal $V_{OUT}$ to protect the power converter; or when the voltage amplitude of the AC power decreases to cause the second voltage to fall below a lower-bound threshold of a hysteresis band, and remain under an upper-bound threshold of the hysteresis band for more than a second period, the PWM controller 300 will shut down the PWM signal $V_{OUT}$ to prevent the first NMOS transistor 310 from getting damage (As is known, a smaller amplitude of the AC power will result in a larger power consumption on the first NMOS transistor 310, so the PWM signal has to be shut down to prevent the power consumption of the first NMOS transistor 310 from exceeding a maximum rated value when the AC power has a voltage amplitude smaller than a minimum rated value).

Figure 4:
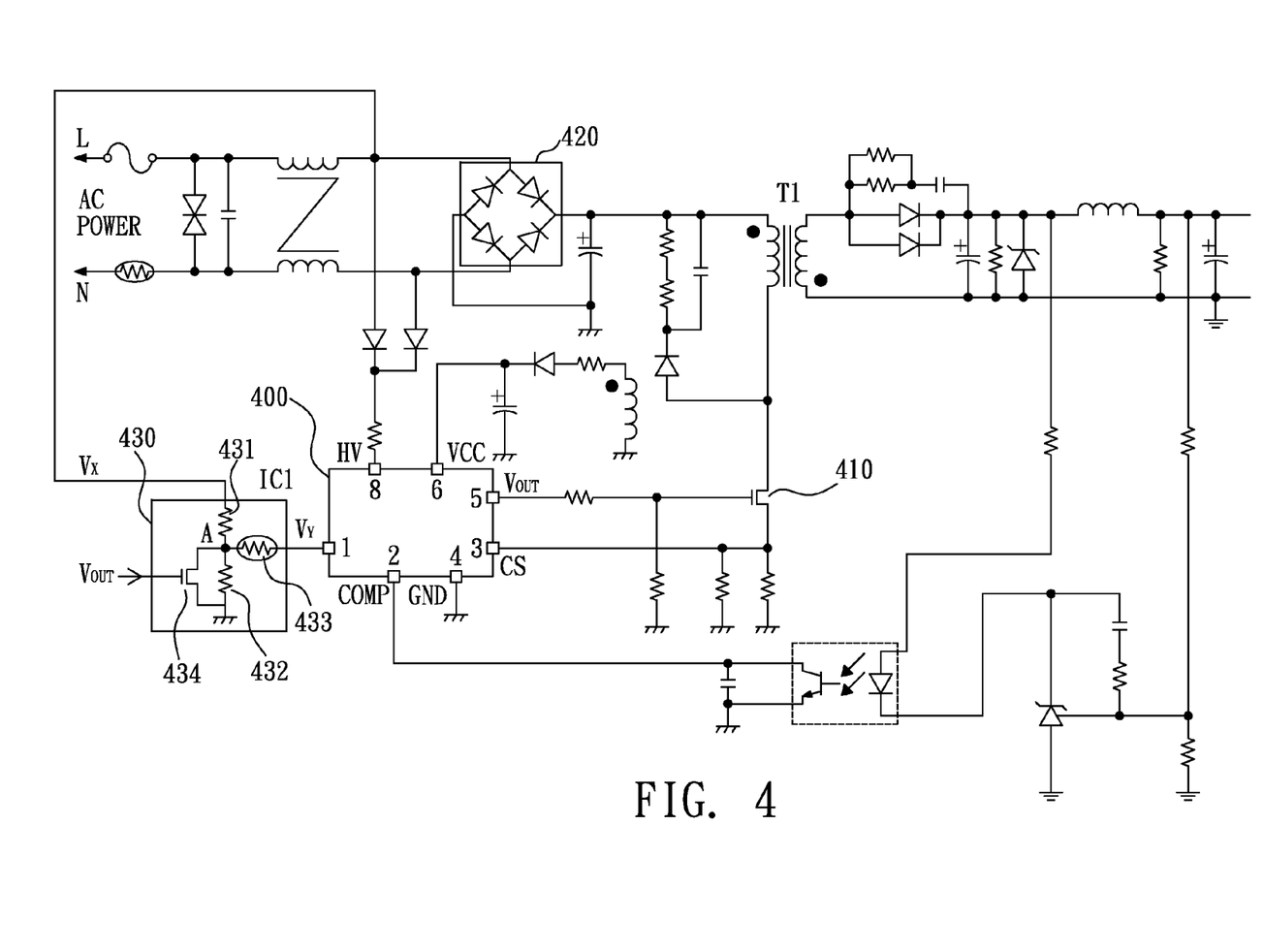
FIG. 4 illustrates a circuit diagram of a power converter according to another preferred embodiment of the present invention.

The AC line signal $V_X$ of FIG. 3 can also be derived from other circuit points. Please refer to FIG. 4, which illustrates a circuit diagram of a power converter according to another preferred embodiment of the present invention. As illustrated in FIG. 4, the power converter includes a PWM controller 400, a first NMOS transistor 410, a bridge rectifier 420, and a sensing circuit 430, which includes a first resistor 431, a second resistor 432, a negative-temperature-coefficient resistor 433, and a second NMOS transistor 434; and the AC line signal $V_X$ is derived from a circuit point between an AC power and the bridge rectifier 420.

Figure 5:
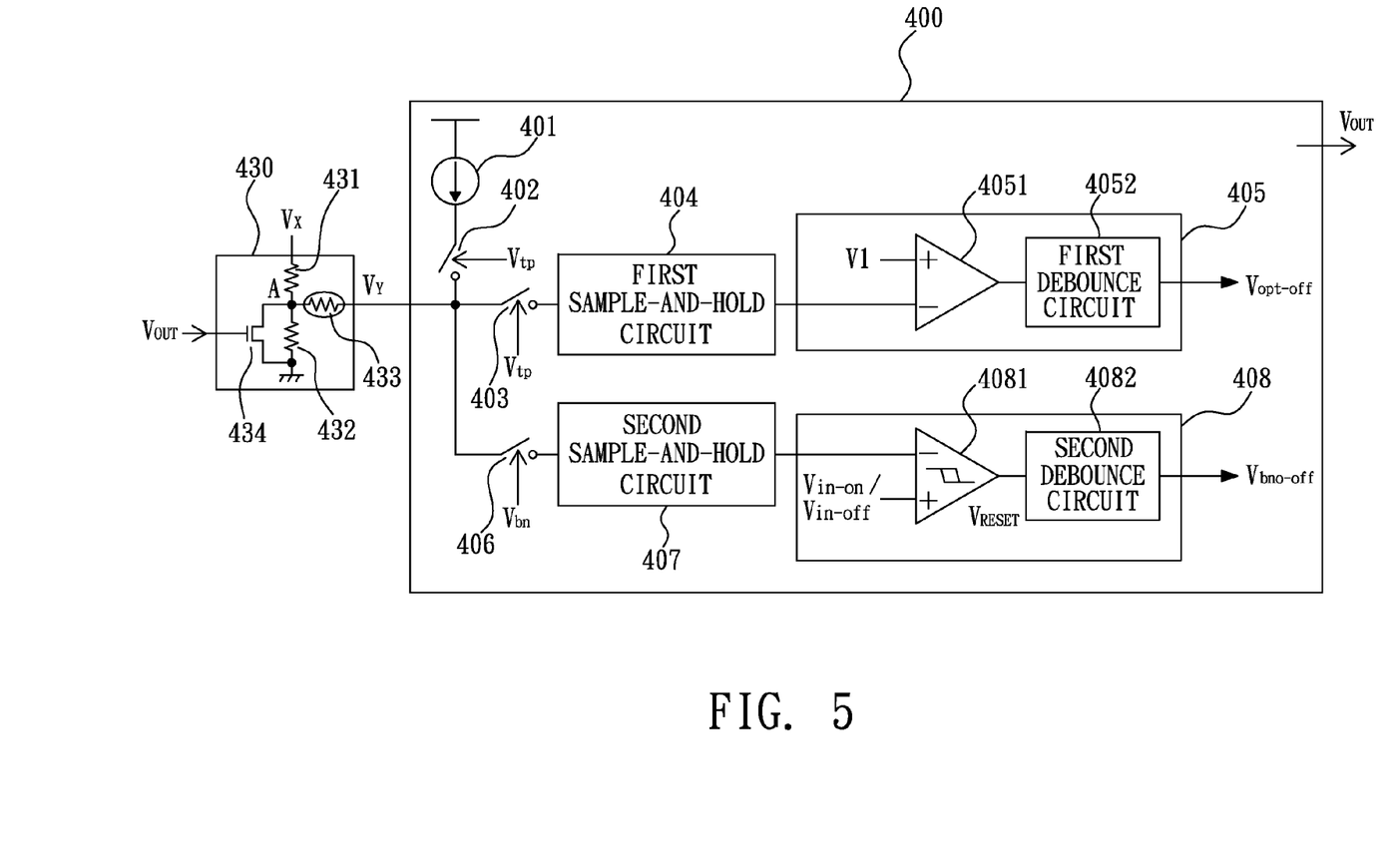
FIG. 5 illustrates a detailed block diagram of a PWM controller and a circuit formed by the PWM controller and a sensing circuit of FIG. 4.

FIG. 5 illustrates a detailed block diagram of the PWM controller 400 and a circuit formed by the PWM controller 400 and the sensing circuit 430. As illustrated in FIG. 5, the PWM controller 400 includes a current source 401, a first switch 402, a second switch 403, a first sample-and-hold circuit 404, a first detection circuit 405, a third switch 406, a second sample-and-hold circuit 407, and a second detection circuit 408.

The current source 401 has a current input end coupled to a DC voltage and a current output end for providing a constant current to flow out the dual-function pin when a control signal $V_{tp}$ is active.

The first switch 402 has a first control end coupled to the first control signal $V_{tp}$, which is active when the PWM signal $V_{OUT}$ is at a high level, a first channel end coupled to the current output end of the current source 401, and a second channel end coupled to the dual-function pin.

The second switch 403 has a second control end coupled to the first control signal $V_{tp}$, a third channel end coupled to the dual-function pin, and a fourth channel end coupled to the first sample-and-hold circuit 404.

The first sample-and-hold circuit 404 has an input coupled with the fourth channel end of the second switch 403, and an output for providing a first sampled voltage.

The first detection circuit 405 having an input terminal coupled to the output of the first sample-and-hold circuit 404, and an output terminal for providing a first detection signal $V_{otp\text{-}off}$. The first detection circuit 405 includes a first comparator 4051 and a first debounce circuit 4052. The first comparator 4051 has a first positive input coupled to a first reference voltage $V_1$, a first negative input coupled with the input terminal first detection circuit 405, and a first comparison output coupled to the first debounce circuit 4052. The first debounce circuit 4052 has an input coupled to the first comparison output, an output coupled with the output terminal of the first detection circuit 405, and a first debounce time set equal to the first period—can be for example but not limited to 100 μs—to avoid false detections. The output of the first debounce circuit 4052 will be at an active level (for example, a high level) to shut down the PWM signal $V_{OUT}$ when the voltage at the input thereof has stayed at a high level for more than the first period.

The third switch 406 has a third control end coupled to a second control signal $V_{bn}$, which is active when the PWM signal $V_{OUT}$ is at a low level, a fifth channel end coupled to the dual-function pin, and a sixth channel end coupled to the second sample-and-hold circuit 407.

The second sample-and-hold circuit 407 has an input coupled with the sixth channel end of the third switch 406, and an output for providing a second sampled voltage.

The second detection circuit 408 having an input terminal coupled to the output of the second sample-and-hold circuit 407, and an output terminal for providing a second detection signal $V_{bno-off}$. The second detection circuit 408 includes a second comparator 4081 and a second debounce circuit 4082. The second comparator 4081 is a hysteresis comparator and has a second positive input coupled to an upper-bound voltage $V_{in-on}$ or a lower-bound voltage $V_{in-off}$, a second negative input coupled with the input terminal of the second detection circuit 408, and a second comparison output providing a reset signal $V_{RESET}$. The second debounce circuit 4082 has an input coupled to the second comparison output, an output coupled with the output terminal of the second detection circuit 408, and a second debounce time set equal to the second period—can be for example but not limited to 75 ms—to avoid false detections. The output of the second debounce circuit 4082 will be at an active level (for example, at a high level) to shut down the PWM signal $V_{OUT}$ when the reset signal $V_{RESET}$ has stayed at a high level for more than the second period.

When the PWM signal $V_{OUT}$ is at a high level, the second NMOS transistor 434 will be turned on, the first control signal $V_{tp}$ will be active to switch on the first switch 402 and the second switch 403, the current of the current source 401 will flow through the negative-temperature-coefficient resistor 433 to generate a voltage for the sensed signal $V_Y$ to represent a temperature, and the first sample-and-hold circuit 404 will sample the sensed signal $V_Y$ to generate the first sampled voltage.

When the PWM signal $V_{OUT}$ is at a low level, the second NMOS transistor 434 will be turned off, the sensed signal $V_Y$ will be equal to a divided voltage—generated by the first resistor 431 and second resistor 432—of the AC line signal $V_X$, the second control signal $V_{bn}$ will be active to switch on the third switch 406, and the second sample-and-hold circuit 407 will sample the sensed signal $V_Y$ to generate the second sampled voltage. It is to be noted that the second NMOS transistor 434 driven by the PWM signal $V_{OUT}$ can be replaced with a PMOS transistor driven by a complementary signal of the PWM signal $V_{OUT}$.

Figure 6:
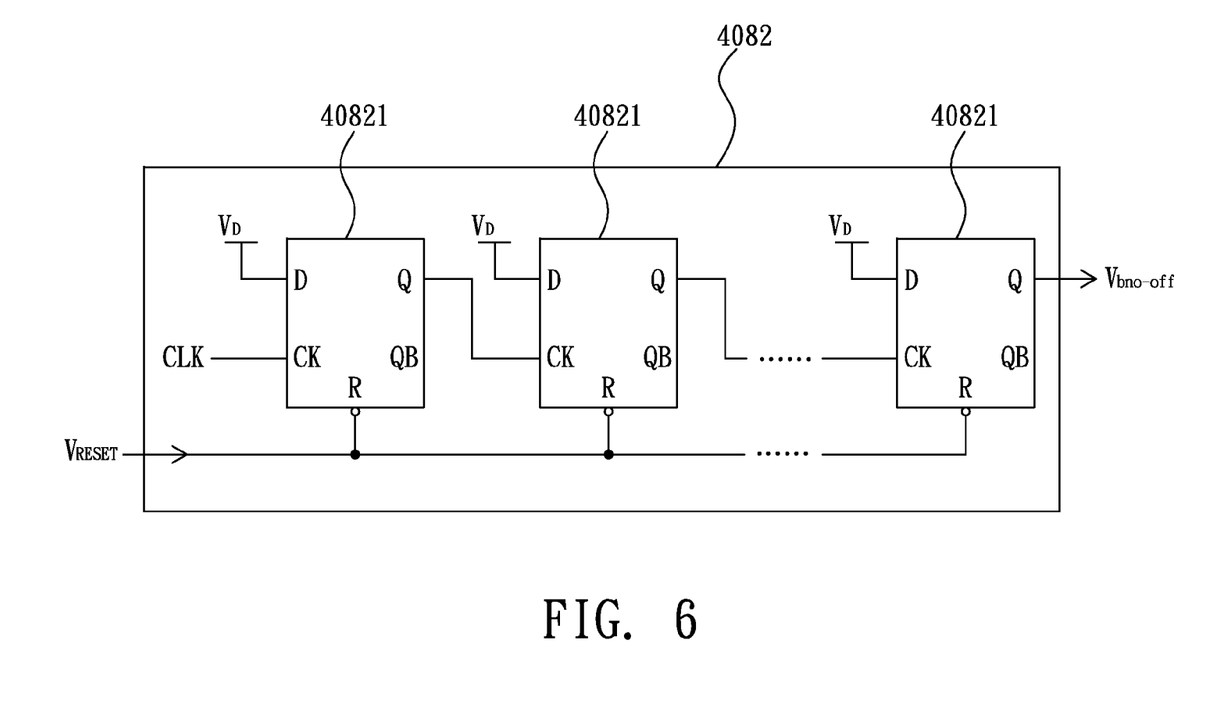
FIG. 6 illustrates a preferred embodiment of a second debounce circuit of FIG. 5.

FIG. 6 illustrates a preferred embodiment of the second debounce circuit 4082. As illustrated in FIG. 6, the second debounce circuit 4082 has multiple flip-flops 40821, each of which has a data input D, a clock input CK, a reset input R, and a state output Q, with the data input D coupled to a DC voltage $V_D$ and the reset input R coupled to the reset signal $V_{RESET}$. The clock input CK of a first flip-flop of the multiple flip-flops 40821 is coupled with a clock signal CLK, and the clock input CK of each of the other of the multiple flip-flops 40821 is coupled with the state output Q of a preceding flip-flop 40821. The state output Q of a last flip-flop of the multiple flip-flops 40821 provides the second detection signal $V_{bno-off}$.

Figure 7:
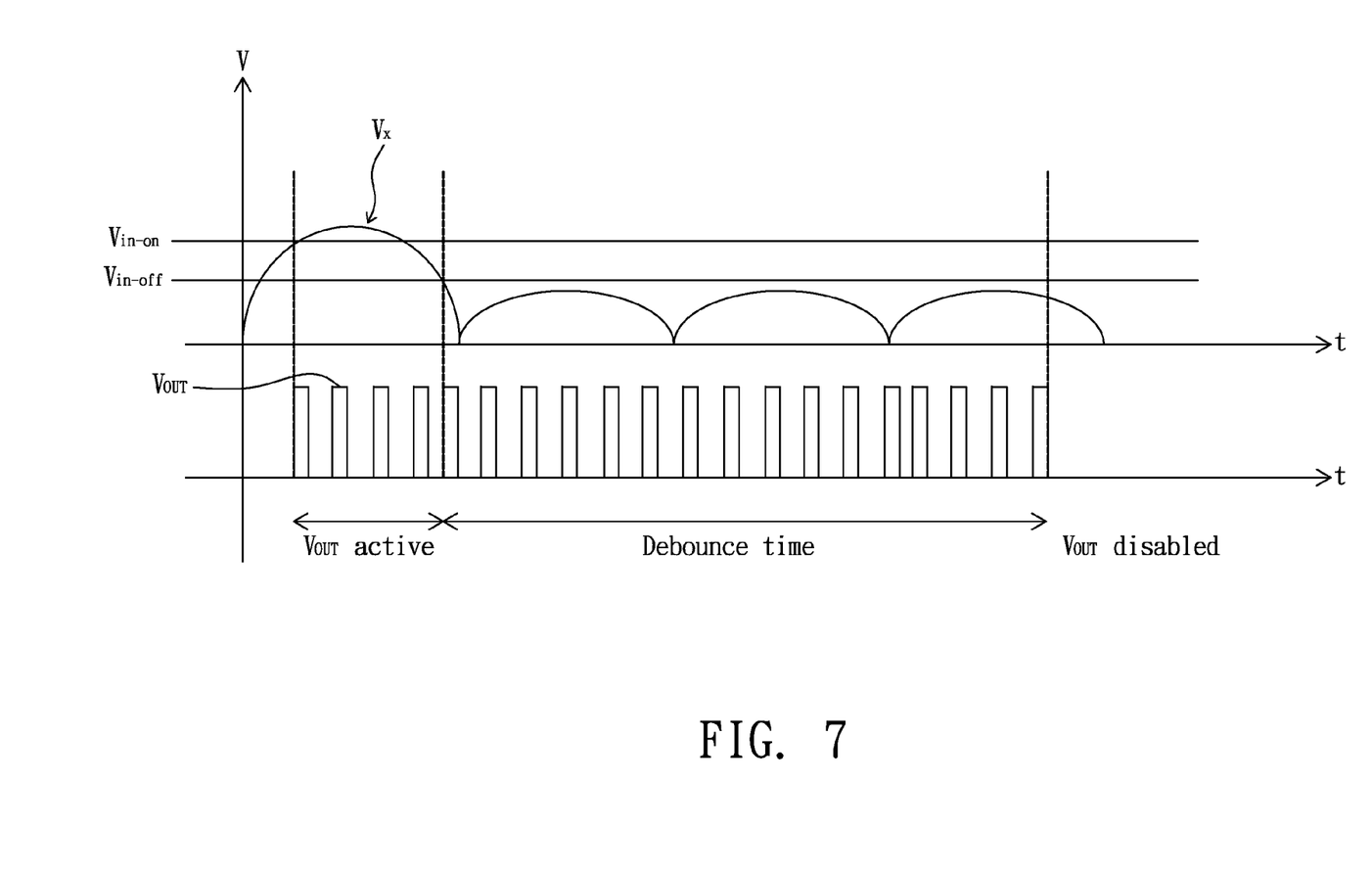
FIG. 7 is a waveform diagram illustrating a scenario where an AC line brownout takes place.

FIG. 7 is a waveform diagram illustrating a scenario where an AC line brownout takes place. As illustrated in FIG. 7, the PWM signal $V_{OUT}$ is disabled when the AC line signal $V_X$ has stayed below the upper-bound voltage $V_{in-on}$ for more than the second period (the second debounce time of the debounce circuit 4082) after falling below the lower-bound voltage $V_{in-off}$.

In conclusion, by virtue of the designs proposed above, the present invention possesses the advantages as follows:

1. The PWM controller of the present invention can detect temperature and AC line voltage via a single pin.
2. The PWM controller of the present invention can provide an over-temperature protection and an AC line brownout protection via a single pin.
3. The power converter of the present invention can detect temperature and AC line voltage via a single pin.
4. The power converter of the present invention can provide an over-temperature protection and an AC line brownout protection via a single pin.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A PWM controller detecting temperature and AC line via a dual-function pin, comprising:
   a current source, having a current output end for providing a constant current;
   a first switch, having a first control end, a first channel end, and a second channel end, said first control end being coupled to a first control signal, which is active when a PWM signal is at a high level, said first channel end being coupled to said current output end of said current source, and said second channel end being coupled to said dual-function pin;
   a second switch, having a second control end, a third channel end, and a fourth channel end, said second control end being coupled to said first control signal, and said third channel end being coupled to said dual-function pin;
   a first sample-and-hold circuit, having an input coupled with said fourth channel end, and an output for providing a first sampled voltage;
   a first detection circuit, having an input terminal coupled to said output of said first sample-and-hold circuit, and an output terminal for providing a first detection signal, wherein said first detection signal will be at an active level to shut down said PWM signal when said first sampled voltage has stayed below a first threshold for more than a first period;
   a third switch, having a third control end, a fifth channel end, and a sixth channel end, said third control end being coupled to a second control signal, which is active when said PWM signal is at a low level, and said fifth channel end being coupled to said dual-function pin, wherein said dual function pin is used for receiving a temperature signal when said PWM signal is at said high level, and for receiving an AC line signal when said PWM signal is at said low level;

a second sample-and-hold circuit, having an input coupled with said sixth channel end, and an output for providing a second sampled voltage; and a second detection circuit, having an input terminal coupled to said output of said second sample-and-hold circuit, and an output terminal for providing a second detection signal, wherein said second detection signal will be at an active level to shut down said PWM signal when said second sampled voltage has stayed below an upper-bound voltage for more than a second period after falling below a lower-bound voltage.

2. The PWM controller detecting temperature and AC line via the dual-function pin as disclosed in claim 1, wherein said first detection circuit comprises:

a first comparator, having a first positive input, a first negative input, and a first comparison output, said first positive input being coupled to a reference voltage set at said first threshold, and said first negative input being coupled with said input terminal of said first detection circuit; and a first debounce circuit, having an input coupled to said first comparison output, an output coupled with said output terminal of said first detection circuit, and a first debounce time set equal to said first period.

3. The PWM controller detecting temperature and AC line via the dual-function pin as disclosed in claim 1, wherein said second detection circuit comprises:

a second comparator, having a second positive input, a second negative input, and a second comparison output, said second positive input being coupled to an upper-bound voltage or a lower-bound voltage, said second negative input being coupled with said input terminal of said second detection circuit, and said second comparison output providing a reset signal; and a second debounce circuit, having an input coupled to said second comparison output, and an output coupled with said output terminal of said second detection circuit, and a second debounce time set equal to said second period.

4. The PWM controller detecting temperature and AC line via the dual-function pin as disclosed in claim 3, wherein said second debounce circuit comprises:

multiple flip-flops, each of which has a data input, a clock input, a reset input, and a state output, with said data input coupled to a DC voltage and said reset input coupled to said reset signal, wherein said clock input of a first flip-flop of said multiple flip-flops is coupled with a clock signal, said clock input of each of the other of said multiple flip-flops being coupled with said state output of a preceding flip-flop; and said state output of a last flip-flop of said multiple flip-flops provides said second detection signal.

5. A power converter detecting temperature and AC line via a dual-function pin, comprising:

a PWM controller, comprising: a current source, having a current output end for providing a constant current;

a first switch, having a first control end, a first channel end, and a second channel end, said first control end being coupled to a first control signal, which is active when a PWM signal is at a high level, said first channel end being coupled to said current output end of said current source, and said second channel end being coupled to said dual-function pin;

a second switch, having a second control end, a third channel end, and a fourth channel end, said second control end being coupled to said first control signal, and said third channel end being coupled to said dual-function pin;

a first sample-and-hold circuit, having an input coupled with said fourth channel end, and an output for providing a first sampled voltage;

a first detection circuit, having an input terminal coupled to said output of said first sample-and-hold circuit, and an output terminal for providing a first detection signal, wherein said first detection signal will be at an active level to shut down said PWM signal when said first sampled voltage has stayed below a first threshold for more than a first period;

a third switch, having a third control end, a fifth channel end, and a sixth channel end, said third control end being coupled to a second control signal, which is active when said PWM signal is at a low level, and said fifth channel end being coupled to said dual-function pin;

a second sample-and-hold circuit, having an input coupled with said sixth channel end, and an output for providing a second sampled voltage; and a second detection circuit, having an input terminal coupled to said output of said second sample-and-hold circuit, and an output terminal for providing a second detection signal, wherein said second detection signal will be at an active level to shut down said PWM signal when said second sampled voltage has stayed below an upper-bound voltage for more than a second period after falling below a lower-bound voltage; and a sensing circuit, comprising: a first resistor, having one end coupled to an AC line signal and another end coupled to a common contact, wherein said AC line signal is corresponding to a voltage amplitude of an AC power;

a second resistor, having one end coupled to said common contact and another end coupled to a ground;

a negative-temperature-coefficient resistor, having one end coupled to said common contact and another end coupled to said dual-function pin; and a first NMOS transistor, having a drain coupled to said common contact, a gate coupled to said PWM signal, and a source coupled to said ground.

6. The power converter detecting temperature and AC line via the dual-function pin as disclosed in claim 5, wherein said first detection circuit comprises:

a first comparator, having a first positive input, a first negative input, and a first comparison output, said first positive input being coupled to a reference voltage set at said first threshold, and said first negative input being coupled with said input terminal of said first detection circuit; and a first debounce circuit, having an input coupled to said first comparison output, an output coupled with said output terminal of said first detection circuit, and a first debounce time set equal to said first period.

7. The power converter detecting temperature and AC line via the dual-function pin as disclosed in claim 5, wherein said second detection circuit comprises:

a second comparator, having a second positive input, a second negative input, and a second comparison output, said second positive input being coupled to an upper-bound voltage or a lower-bound voltage, said second negative input being coupled with said input terminal of said second detection circuit, and said second comparison output providing a reset signal; and a second debounce circuit, having an input coupled to said second comparison output, and an output coupled with said output terminal of said second detection circuit, and a second debounce time set equal to said second period.

8. The power converter detecting temperature and AC line via the dual-function pin as disclosed in claim 7, wherein said second debounce circuit comprises:

multiple flip-flops, each of which has a data input, a clock input, a reset input, and a state output, with said data input coupled to a DC voltage and said reset input coupled to said reset signal, wherein said clock input of a first flip-flop of said multiple flip-flops is coupled with a clock signal, said clock input of each of the other of said multiple flip-flops being coupled with said state output of a preceding flip-flop; and said state output of a last flip-flop of said multiple flip-flops provides said second detection signal.

* * * * *